United States Patent
Enström et al.

(10) Patent No.: US 9,402,206 B2
(45) Date of Patent: Jul. 26, 2016

(54) LOAD BALANCING OF DATA

(75) Inventors: Daniel Enström, Gammelstad (SE); Stefan Wänstedt, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 334 days.

(21) Appl. No.: 13/976,212

(22) PCT Filed: Jan. 5, 2011

(86) PCT No.: PCT/SE2011/050006
§ 371 (c)(1), (2), (4) Date: Jun. 26, 2013

(87) PCT Pub. No.: WO2012/093955
PCT Pub. Date: Jul. 12, 2012

(65) Prior Publication Data
US 2013/0288700 A1    Oct. 31, 2013

(51) Int. Cl.
*H04W 28/08*    (2009.01)
*H04W 28/02*    (2009.01)

(52) U.S. Cl.
CPC ........ *H04W 28/085* (2013.01); *H04W 28/0289* (2013.01); *H04W 28/08* (2013.01)

(58) Field of Classification Search
CPC ............ H04W 28/0289; H04W 28/08; H04W 28/085
USPC ....................................................... 455/453
See application file for complete search history.

(56) References Cited

U.S. PATENT DOCUMENTS

| | | | |
|---|---|---|---|
| 6,882,640 B1 * | 4/2005 | Berger et al. | 370/353 |
| 7,266,110 B1 | 9/2007 | Cao et al. | |
| 2003/0118000 A1 | 6/2003 | Li et al. | |
| 2008/0212575 A1 * | 9/2008 | Westberg | 370/356 |

FOREIGN PATENT DOCUMENTS

| | | |
|---|---|---|
| JP | 2003199145 A | 7/2003 |
| WO | 0001186 A1 | 1/2000 |
| WO | 0189251 A1 | 11/2001 |
| WO | 2008022069 A1 | 2/2008 |

* cited by examiner

*Primary Examiner* — Vladimir Magloire
*Assistant Examiner* — Erica Navar
(74) *Attorney, Agent, or Firm* — Murphy, Bilak & Homiller, PLLC

(57) ABSTRACT

A method and arrangement for controlling a balance between Packet Switched (PS) data, and Circuit Switched (CS) data in a cellular communication network. A network node is arranged in a cellular communication network to control communication of PS data between a first UE and a base station, and to control communication of CS data between a second UE and the base station. Both the first UE, the second UE and the base station are associated to the cellular communication network and are located in the cell. The network node comprises a controller 402 which is adapted to identify a risk of congested communication of data, and a transceiver 406 which is adapted to communicate PS data with the first base station, and to communicate CS data with the second base station. The controller is further adapted to request the second UE to change communication settings, and the controller is further adapted to reallocate transmission resources from the second UE, to the first UE.

20 Claims, 4 Drawing Sheets

LOAD BALANCING OF DATA

TECHNICAL FIELD

The invention relates generally to optimising loads in cellular communication networks. Especially, it relates to adjustments of the relation between circuit switched data and packet distributed data in telecommunication systems.

BACKGROUND

Today, communication of data and speech in communication networks is commonly distributed circuit switched (CS) or packet switched (PS). In CS communication, a communication channel is reserved for the communication. In PS, on the other hand, communication of data or speech is divided in packets where the packets may be distributed various ways from a sending party to a receiving party, e.g. in shared communication resources. Moreover, in PS, various buffering steps are arranged at the communication parties and between them. The buffering steps achieve the receiving party to arrange the received packets and recover the data sent from the sending party. Lost packets, or packets affected by noise, can be identified and requested to be resent from the sending party. Thereby, PS communication is less sensitive to disturbances, but is instead delayed by various buffering steps and recovering procedures. In CS, the communication is not delayed, but is instead more sensitive for disturbances.

In this description, the term "User Equipment" (UE) will be used to denote any suitable communication terminal adapted to communicate with a base station. A UE may be implemented as a mobile phone, a FDA (Personal Digital Assistant), a handheld computer, a laptop computer, etc. In communication networks where both CS data and PS data are communicated, e.g. WCDMA (Wideband Code Division Multiple Access), a "base station" may be implemented as a NodeB, a repeater, etc.

An example of a cellular communication network where both CS communication and PS communication of data are applied will now be described with reference to FIG. 1, and according to the prior art.

In a communication network 100 a Radio Network Controller (RNC) 102 is arranged to control communication of data which is communicated in the network 100. The communication network 100 comprises also a radio base station 104 which is arranged to communicate user data with various UEs 106, 108, 110. The base station 104 communicates CS based user data with the UE 106, and PS based user data with the UEs 108 and 110. The UEs 108 and 110 are illustrated as different types of UEs, but both of them are communicating PS data. In the communication network 100, PS data and CS data share the same transmission resources, i.e. the UEs 106, 108, and 110 are located in the same cell. In this description the terms "CS data" and "PS data" will be used to denote user data which is communicated circuit switched, and user data which is communicated packet switched, respectively.

Real time services, such as voice, require timely reception of data but are usually robust to handle some level of data errors. Historically, CS is the typical choice for communication in real time, e.g. voice communication. For other services, where it is more important that all data is correctly communicated, which are less sensitive to delays, e.g. data communication, e-mail, FTP, etc., PS is the typical alternative. Typically, CS services are prioritised over PS services in the communication network. The PS services can therefore be used to fill out and optimise the use of the communication network.

However, with the emergence of communication services, e.g. heavy data usage of mobile broadband, there could be PS services which have to be prioritised over CS services, e.g. PS based emergency services, control signalling related to PS, etc. It might not be that attractive to limit the use of CS services to be prepared to provide additional PS services in the communication network. Terminating CS services is not either attractive to the service providers and the CS users. The providers are then not able to reliably deliver the service, and the CS users perceive abruptly broken services annoying.

It is thus a problem to provide reliable communication conditions for communication of PS data in combined communication networks for CS data and PS.

SUMMARY

It is an object of the invention to address at least some of the problems outlined above. Especially, there is an object to provide efficient and flexible transmission capacity for PS data and still providing robust communication conditions for CS data in combined communication networks. It is also an object to optimise the use of the transmission capacity in the communication networks.

According to one aspect, a method in a network node is provided for controlling a balance of transmission resources in a cell of a cellular communication network. The network node is arranged in the cellular communication network to control communication of Packet Switched data, PS, between a first User Equipment, UE, and a base station, and to control communication of Circuit Switched data, CS, between a second UE and the base station. Both the first UE, the second UE and the base station are associated to the cellular communication network and are located in the cell. When performing the method a risk of congested communication of data is identified, and the second UE is requested to change one or more communication settings for the communication of CS data. Furthermore, the network node monitors that the second UE has changed communication settings in accordance with the request, and reallocates transmission resources from the second UE to the first UE.

According to another aspect, a network node is provided which is adapted to control a balance of transmission resources in a cell in a cellular communication network. The network node is arranged in the cellular communication network to control communication of PS data between a first UE and a base station, and to control communication of CS data between a second UE and the base station. Both the first UE, the second UE and the base station are associated to the cellular communication network and are located in the cell. The network node comprises a controller which is adapted to identify a risk of congested communication of data, and a transceiver which is adapted to communicate PS data with the first base station, and to communicate CS data with the second base station. The controller is further adapted to request the second UE to change communication settings, and the controller is further adapted to reallocate transmission resources from the second UE, to the first UE.

The above method and arrangement may be used to obtain reliable communication conditions for CS data and PS data in combined communication networks. Furthermore, flexible transmission capacity for PS data may be achieved, when still providing robust communication conditions for CS data.

Further possible features and benefits of this solution will become apparent from the detailed description below. It is possible to achieve these objects and others by using a method and an arrangement as defined in the attached independent claims.

BRIEF DESCRIPTION OF DRAWINGS

The invention will now be described in more detail by means of exemplifying embodiments and with reference to the accompanying drawings, in which.

DETAILED DESCRIPTION

Briefly described, a solution is provided for achieving a more flexible use of transmission capacity in combined cellular communication networks for communication of both PS data and CS data. By identifying a risk for congested communication of data, a network node requests a base station communicating CS data, to adjust communication settings and decrease the transmission capacity for CS data. The network node reallocates then transmission capacity for PS data based on the decreased transmission capacity for CS data.

"Adaptive Multi-Rate audio codec", hereafter referred to as AMR, is an audio data compression scheme, which can be employed for speech coding. In AMR, different codec modes, requiring different transmission capacity, are applied in the communication to optimise the use of a communication channel. Typically a lower codec mode will be applied for a channel with a lower quality, but a higher codec mode will be applied for a channel with higher quality. Typically, in AMR, a network node uses 1 of 8 different AMR codec modes.

"Explicit Congestion Notification" (ECN) is an extension to the Internet Protocol (IP) and may be applied to notify a user that there is a risk for congested communication. ECN may be implemented both for connection oriented transport protocols as TCP (Transmission Control Protocol), and for connectionless protocols as UDP (User Datagram Protocol). A network node being capable to apply ECN, will assign two bits in the IP header a specific value when having identified a risk for congested communication. For instance, a risk for congested communication may be identified when the amount of lost packet exceeds a specific threshold, some buffering step is filled, or the amount of retransmissions exceeds a specific threshold, etc. ECN is defined in RFC 3168 of IETF (The Internet Engineering Task Force).

Typically, when Explicit Congestion Notification (ECN) is implemented and risk for congestion is identified the DiffServ field of the IP header is assigned the value "11". When no risk is identified corresponding bits are assigned the value "01", or "10", as defined in the table below.

| ECN value | Indicating | Short |
|---|---|---|
| "00" | Non ECN-Capable Transport | Non-ECT |
| "10" | ECN Capable Transport (0) | ECT (0) |
| "01" | ECN Capable Transport (1) | ECT (1) |
| "11" | Congestion Encountered | CE |

"Codec Mode Request" (CMR) is a part of the AMR bitstream, and is defined in RFC 3558 of IETF.

Figure 1:
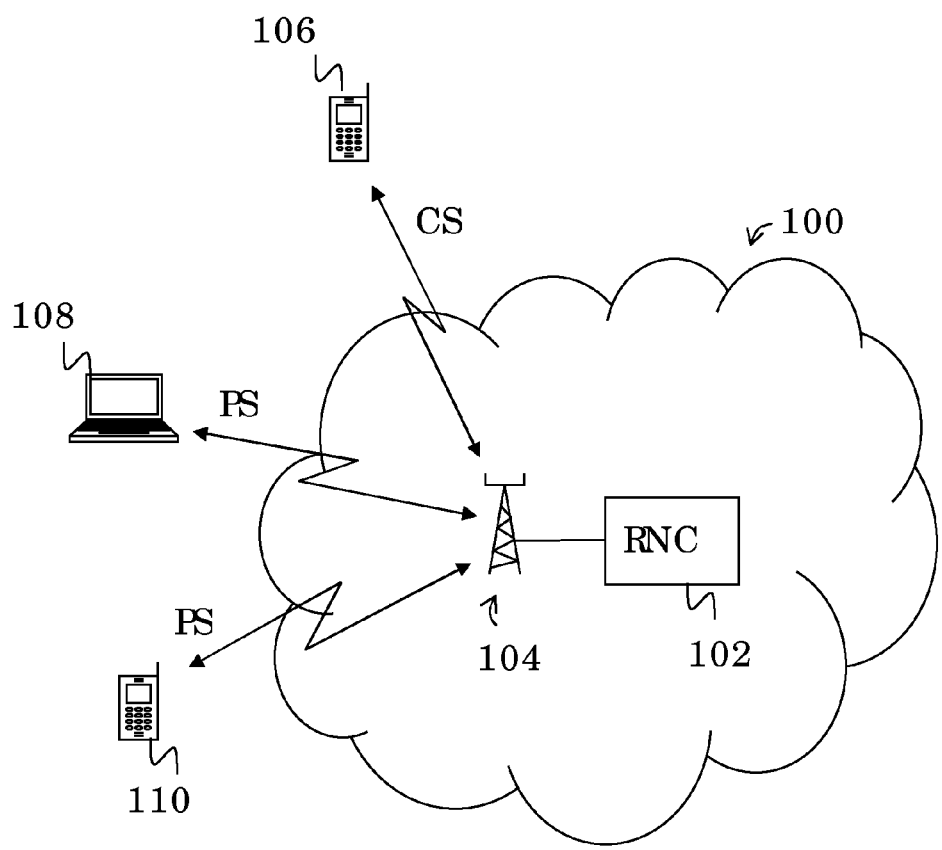
FIG. 1 is an environmental illustration of a communication network handling as well communication of PS data and CS data, according to the prior art.
Figure 2:
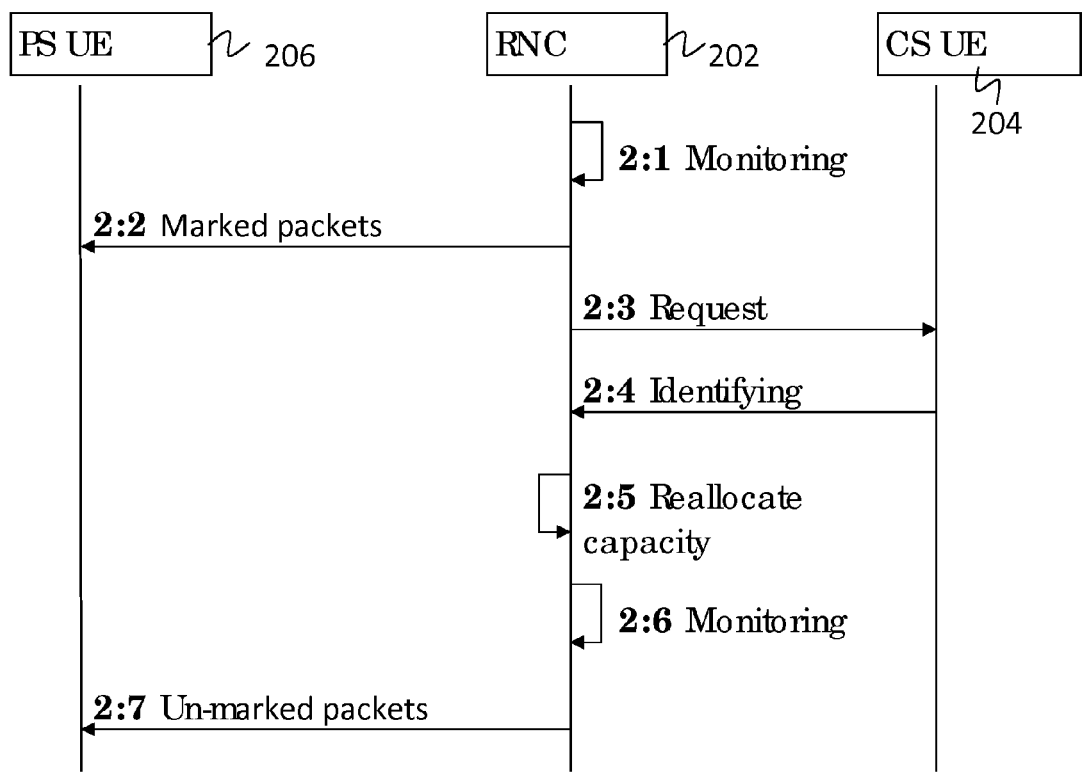
FIG. 2 is a signalling chart illustrating a method in a communication network, in accordance with an exemplifying embodiment.

With reference to FIG. 2, which is a schematic signalling chart, a scenario where a RNC controls communication of PS data and communication of CS data in a cell in a cellular communication network will now be described, according to an exemplifying embodiment. In the cellular communication network (not shown) a Radio Network Controller (RNC) 202 is arranged to control the communication of data in the cellular communication network. The cellular communication network comprises further UEs 204, 206 who are arranged to communicate user data with the RNC 202. The communication of data between the RNC 202 and the UEs 204, 206 is typically performed via a base station, which transmission resources are shared between the UEs 204, 206, the UEs 204, 206 sharing transmission resources of the base station. However, for simplicity reasons the base station is not shown in the figure. The UE 204 communicates CS data and the UE 206 communicates PS data.

In a first action 2:1, the RNC 202 monitors the PS communication of data with the UE 206 to identify if there is risk for congested PS communication of data with the UE 206. A threshold value for a delay in a buffering step is predetermined and when the buffering delay exceeds the threshold value, the risk for congested PS communication is identified. As described in another example embodiment, may alternative parameters be used when identifying that there is risk for congested communication of PS data.

In another action 2:2, the RNC 202 start to mark transmitted packets with CE, as will be described in an example embodiment below. The CE marking is to inform the PS UE 206 that a risk for congested communicated PS data is identified, and to enable the PS UE 206 to apply alternative communication settings.

The RNC 202 requests also the UE 204 which communicates CS data, to change AMR modes, in a following action 2:3. Typically, the request is formed by assigning specific values to CMR bits of the AMR bit-stream, as will be described below in accordance with another exemplifying embodiment.

The RNC 202 monitors then, in another action 2:4, if the CS base stations 204 changes AMR modes in accordance with the request of action 2:3. Then, due to the changed AMR modes the RNC 202 reallocates transmission resources for PS communication, in another action 2:5.

In a following action 2:6, the RNC 202 proceeds identifying risk for congested PS communication, corresponding to in the action 2:1. If the risk has been decreased below the threshold, the RNC will stop to CE mark the packets being communicated with the PS base stations 206 in a following action 2:7, else the RNC 202 repeats the procedure from the action 2:2, proceeds to CE mark the packets, and requests the CS base stations 204 to further reduce the transmission resources used, i.e. further change AMR modes, etc.

In an alternative exemplifying embodiment, which is based on the above one, the RNC 202 further determines whether the CS base stations 204 will be requested to change AMR modes. As described below, this may be determined depending of if there are available AMR modes for the CS base stations 204.

It is to be noted that the concept is not limited to use specific separate UEs 204, 206 for just CS based or PS based communication. Generally, a base station is capable to communicate as well CS data with some UEs and PS data with other UEs simultaneously. A base station may further communicate PS data for some applications used by a UE, and CS data for other applications used by the same UE. However, for simplicity reasons and in order to make the understanding of the concept easier, the communication of CS data and the communication of PS data are illustrated as being performed by separate UEs. It is also to be noted that the concept is not limited to be applied for only one PS UE and one CS UE, it can easily be modified to a plurality of PS UEs and CS UEs who are sharing the same transmission resources.

Figure 3:
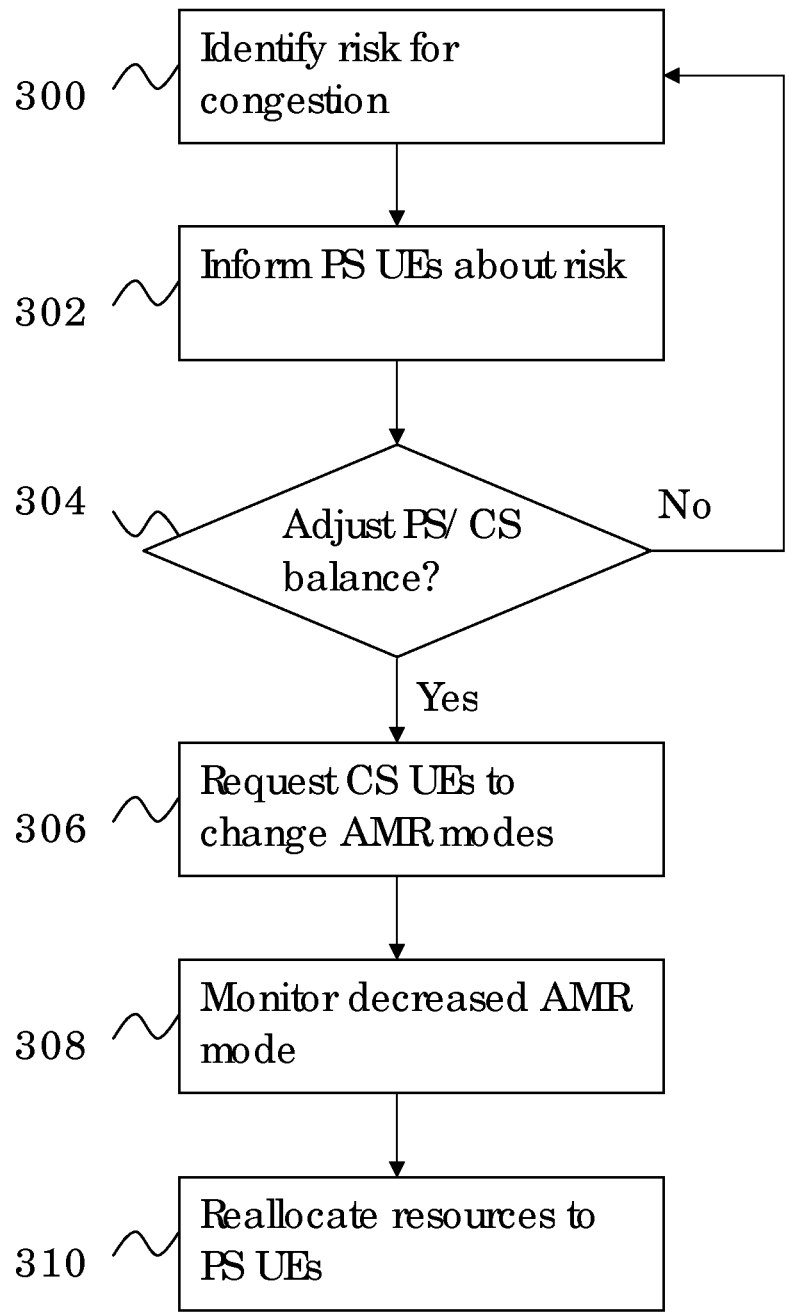
FIG. 3 is a flow chart illustrating a method in a network node, in accordance with an exemplifying embodiment.

With reference to FIG. 3, which is a schematic flow chart, a method in a network node will now be described in accordance with an exemplifying embodiment. The network node is here implemented as a Radio Network Controller (RNC), which is arranged to control both PS data communicated with UEs, and CS data communicated with UEs in a cellular communication network.

In a first action 300, the RNC identifies a risk for congested communicated PS data. The identification is here performed by monitoring one or more delays in some buffering steps of the RNC. However, the identification of the risk for congested PS data may be differently performed within the concept, e.g. by monitoring queue lengths in any buffering step, the amount of retransmissions, etc.

In another action 302, the RNC informs the base stations which communicate PS data that a risk for congested communication is identified, by assigning a specific value "11" to so called CE-bits of the DiffServ field in the IP headers of the packets communicated with the UEs. As described above, the value "11" indicates Congestion Encountered, CE.

In a following action 304, the RNC determines whether the balance between transmission resources for communication of PS data and communication of CS will be adjusted. When determining the balance, the RNC checks which transmission resources/capacity that are currently used for communication of CS data, and decides if any of this capacity will be reallocated to communication of PS data. The communication of CS data uses here AMR, and the decision is based on which AMR mode that is used, and if there are any available AMR modes which require less transmission resources than the currently used AMR mode. If the RNC determines that the balance between transmission resources will be adjusted, it executes an action 306, which will be described below, else the RNC returns to action 300 and proceeds identifying risks for congested communication of PS data.

However, even if there exists lower available AMR modes, the RNC may still have restrictions from using a lower AMR mode, i.e. a lower AMR mode could be defined as resulting in too low audio quality.

In the following action 306, the base stations which communicate CS data are requested to decrease the transmission resources currently used for CS data. The request is implemented by assigning a specific value to CMR bits of the AMR bit-stream. By decreasing the use of transmission resources for communication of CS data, these transmission resources are possible to reallocate to communication of PS data, as will be described below in an action 310.

The RNC monitors then the transmission resources applied for communication of CS data, to identify that one or more base stations who communicates CS data have reduced their use of transmissions resources and use a lower AMR level, in another action 308.

Then, in the final action 310, the RNC reallocates transmission resources from communication of CS data to communication of PS data. After having reallocated transmission resources to PS based communication, the risk for congested PS communication will be decreased.

In an alternative exemplifying embodiment, which is based on the one above, the RNC returns to action 300 to identify risk for congested PS based communication, when having executed the action 310. When no risk is identified, the RNC will end marking CE to the headers, and will instead assign another value to these bits, as indicated above when defining ECN. But if still a risk for congested communicated data is identified, the RNC will still mark the CE bit and proceed the method from action 302. Typically, the RNC will continue to identify risk for congested data, even when the RNC no longer to marks CE to the headers.

Even if buffering delays are analysed in this exemplifying embodiment, to identify a risk for congested PS data, the concept is not limited thereto. The identification may be implemented differently, e.g. by analysing the amount of retransmissions, or queue lengths of any buffering step.

Figure 4:
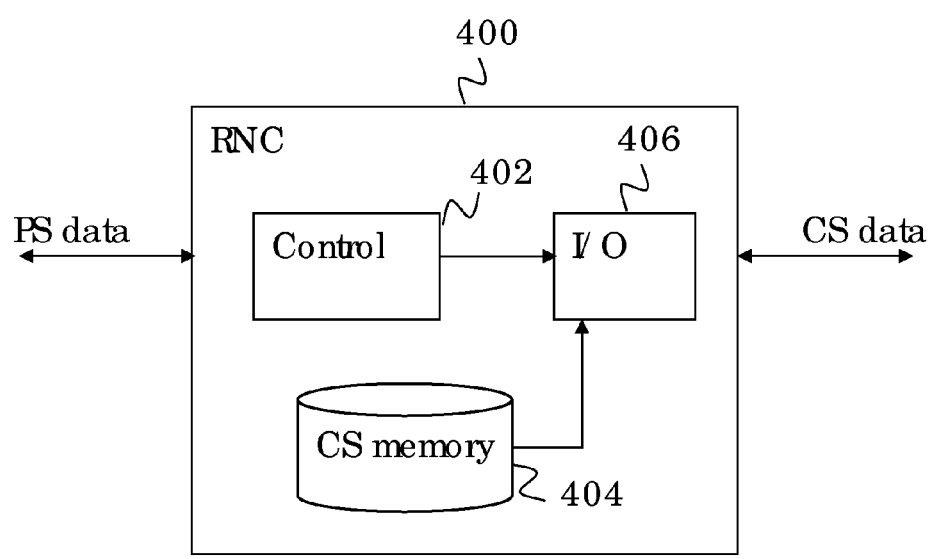
FIG. 4 is a block diagram illustrating network node, in accordance with an exemplifying embodiment.

With reference to FIG. 4, which is a schematic block diagram, a Radio Network Controller (RNC) 400, will now be described in accordance with an exemplifying embodiment.

The RNC 400 is adapted to be arranged in a cellular communication network, to control both PS data communicated with one or more UEs, and CS data communicated with one or more other UEs, the UEs sharing the same transmission resources, i.e. the UEs are located in the coverage area of one and the same base station.

The RNC 400 comprises a controller 402, a memory 404, and a transceiver 406. The controller 402 is adapted to identify a risk of congested communication of PS data. When identifying the risk, the controller 402 monitors some communication parameters and determines whether a specific condition is fulfilled or not for the communication parameter(s). For instance, the controller 402 will determine the buffering delays in any buffering step, as described above in another exemplifying embodiment.

The controller 402 is further adapted to inform the UEs who communicate data PS based (hereafter called PS UEs) with the RNC 400 that a risk for congested communication is identified. The information is implemented by assignment the value "11" to CE bits of the packet headers, as described in another embodiment. Correspondingly, to in an embodiment described above, the controller 402 and the transceiver 406 are adapted to communicate data and information with the UEs via a base station (not shown).

When congestion of PS data is identified, the RNC 400 will request the UEs who communicate CS based (hereafter called CS UEs) to change communication settings. In this exemplifying embodiment the communication settings comprise AMR, and the controller 402 is adapted to request the CS UEs to change AMR modes and use an AMR mode which requires less transmission resources. The memory 404 is arranged to store the currently applied AMR mode for the CS UEs, and the controller 402 is adapted to compare the currently applied AMR mode with the AMR modes that are available to apply. The controller 402 is further adapted to form the request to change AMR modes based on the comparison. In this exemplifying embodiment, the request is implemented according to the CMR (Codec Mode Request), as described in another exemplifying embodiment. Moreover, the controller 402 is adapted to monitor the AMR mode that is currently used by the CS UEs, and compare with the stored AMR mode, and reallocate transmission capacity to PS UEs when changes of AMR modes are identified.

The controller 402 is further adapted to proceed to identify risk for congested PS communicated data, and when no risk is identified to stop marking packets with CE, i.e. stop to assign the value "11" to the CE bits.

The transceiver 406 is adapted to communicate data PS based with the PS UEs, and to communicate data CS based with the CS UEs.

However, the RNC 400 is not limited to comprise the memory 400, and the controller 402 is not limited to compare the currently applied AMR mode with the available AMR modes. In an alternative exemplifying embodiment, the memory 404 may be omitted and the controller 402 will not be aware of which AMR mode that is currently applied. The controller 402 is then instead adapted to form a request to the CS UEs to decrease AMR mode, and will receive a confirmation from the CS UEs that they have decreased the applied AMR mode. In this alternative embodiment, the controller 402 will instead reallocate transmission resources based on the received confirmation.

It should be noted that FIG. 4 merely illustrates various functional unit in the RNC 400, in a logical sense, although the skilled person is free to implement these functions in practice using any suitable software and hardware means. Thus, the invention is generally not limited to the shown structure of the RNC 400, while its functional unit may be configured to operate according to the methods and procedures described above for FIGS. 2-3, where appropriate. For instance, any functionality in a specific functional unit may be placed in another suitable functional unit, where appropriate.

Furthermore, it is to be understood that the RNC 400 described above in this description also comprises additional conventional means providing functionality, such as e.g. various control unit and memories, necessary for enabling common functions and features to operate properly. However, for simplicity reasons, any means or functionality which is not necessary for the understanding of the proposed control of transmission resources has been omitted in the figures, and will not be discussed in any further detail in this description.

Although procedures are described for controlling the balance of transmission resources between PS based communication of data and CS based communication of data in an RNC in a communication are described in the exemplifying embodiments above, the concept is not limited thereto. The described procedures and the RNC itself can easily, as is realised by one skilled in the art, be adapted to be applied to any network node capable to communicate data both PS based and CS based in a suitable cellular communication network.

The concept is generally defined by the following independent claims. Exemplifying embodiments are defined by the independent claims.

ABBREVIATIONS

AMR Adaptive Multi-Rate
CS Circuit Switched
CMR Codec Mode Request
ECN Explicit Congestion Notification
PS Packet Switched
RNC Radio Network Controller

The invention claimed is:

1. A method in a network node for controlling a balance of transmission resources in a cell of a cellular communication network, the network node being arranged in the cellular communication network to control communication of Packet Switched (PS) data between a first User Equipment (UE) and a base station, and to control communication of Circuit Switched (CS) data between a second UE and the base station, the first UE, the second UE, and the base station being associated to the cellular communication network and located in the cell, the method comprising:
  identifying a risk of congested communication of data, wherein the identifying relates to PS data communicated with the first UE and comprises one or more of monitoring retransmissions of packets for the first UE, monitoring buffering delays for the first UE, and monitoring queue lengths for the first UE;
  requesting the second UE to change one or more communication settings for the communication of CS data;
  monitoring that the second UE has changed communication settings in accordance with the request; and
  reallocating transmission resources from the second UE to the first UE.

2. The method according to claim 1, further comprising informing the first UE that the risk for congestion is identified.

3. The method according to claim 2, wherein two or more first UEs are informed that there is a risk for congested communication.

4. The method according to claim 1, wherein the identifying further comprises informing the first UE that the risk for congested communication is identified, by assigning specific values to specific bits of headers of the packets being communicated with the first UE.

5. The method according to claim 4, wherein the headers are IP headers and the specific bits are comprised in the DiffServ field of the IP headers, according to Explicit Congestion Notification (ECN).

6. The method according to claim 1, further comprising determining if the second UE shall be requested to change communication settings.

7. The method according to claim 1, wherein the second UE is requested to apply communication settings requiring less transmission resources for communication of CS data than the currently applied transmission resources for communication of CS data.

8. The method according to claim 1, wherein the requesting is implemented by assigning specific values to one or more Codec Mode Request (CMR) bits, the CMR bits being comprised in the CS data being communicated with the second UE.

9. The method according to claim 1, wherein the monitoring that the second UE has changed communication settings in accordance with the request comprises identifying that the second UE has changed communication settings in accordance with the request.

10. The method according to claim 1, wherein the communication settings comprise Adaptive Multi-Rate (AMR) audio codec modes.

11. The method according to claim 10, wherein two or more second UEs are requested to change AMR audio codec modes.

12. A network node adapted to control a balance of transmission resources in a cell of a cellular communication network, the network node being arranged in the cellular communication network to control communication of Packet Switched (PS) data between a first User Equipment (UE) and a base station, and to control communication of Circuit Switched (CS) data between a second UE and the base station, the first UE, the second UE, and the base station being associated to the cellular communication network and are located in the cell, the network node comprising:
  a controller adapted to identify a risk of congested communication of data, wherein the congested communication of data comprises PS data communicated with the first UE, and wherein the controller is adapted to monitor one or more of retransmissions of packets for the first UE, buffering delays for the first UE, and queue lengths for the first UE;

a transceiver adapted to communicate PS data with the base station, and to communicate CS data with the base station; and the controller being further adapted to request the second UE to change communication settings, and the controller being further adapted to reallocate transmission resources from the second UE, to the first UE.

13. The network node according to claim 12, wherein the controller is further adapted to inform the first UE that the risk for congestion is identified.

14. The network node according to claim 12, wherein the controller is further adapted to inform the first UE that the risk for congested communication is identified, by assigning specific values to specific bits of a header of the packets to be sent to the first UE.

15. The network node according to claim 14, wherein the header is an IP header and the specific bits are comprised in the DiffServ field of the IP header, according to Explicit Congestion Notification (ECN).

16. The network node according to claim 12, wherein the controller is further adapted to determine if the second UE shall be requested to change communication settings.

17. The network node according to claim 12, wherein the controller is further adapted to request the second UE to apply communication settings requiring less transmission resources for communication of CS data than the currently applied transmission resources for communication of CS data.

18. The network node according to claim 12, wherein the controller is further adapted to assign specific values to one or more Codec Mode Request (CMR) bits when requesting the second UE to change communication settings, the CMR bits being comprised in the CS data being communicated with the second UE.

19. The network node according to claim 12, further comprising a memory arranged to store one or more communication settings for the second UE, and wherein the controller is further adapted to compare one or more of the stored communication settings with the currently used communication settings for the second UE.

20. The network node according to claim 12, wherein the communication settings comprises an Adaptive Multi-Rate (AMR) audio codec mode and the memory is arranged to store the currently applied AMR mode, and wherein the controller is adapted to compare the currently applied AMR audio codec mode with a requested AMR audio codec mode.

* * * * *